(12) United States Patent
Bryborn et al.

(10) Patent No.: US 7,385,595 B2
(45) Date of Patent: Jun. 10, 2008

(54) ELECTRONIC PEN AND METHOD FOR RECORDING OF HANDWRITTEN INFORMATION

(75) Inventors: Mattias Bryborn, Lund (SE); Ola Sandström, Lund (SE)

(73) Assignee: Anoto AB, Lund (SE)

( * ) Notice: Subject to any disclaimer, the term of this patent is extended or adjusted under 35 U.S.C. 154(b) by 886 days.

(21) Appl. No.: 10/306,342

(22) Filed: Nov. 29, 2002

(65) Prior Publication Data

US 2003/0107558 A1 Jun. 12, 2003

Related U.S. Application Data

(60) Provisional application No. 60/339,312, filed on Dec. 12, 2001.

(30) Foreign Application Priority Data

Nov. 30, 2001 (SE) .................... 0104041

(51) Int. Cl.
- G06F 3/033 (2006.01)
- G06F 3/037 (2006.01)
- G06F 3/041 (2006.01)
- G09G 5/00 (2006.01)

(52) U.S. Cl. ............ 345/179; 345/156; 345/180; 345/181; 178/18.01; 178/19.01

(58) Field of Classification Search ........ 345/156, 345/173–183, 534, 556, 568; 178/18.01–20.02, 178/18; 382/188, 312, 314
See application file for complete search history.

(56) References Cited

U.S. PATENT DOCUMENTS 5,194,852 A * 3/1993 More et al. ............. 345/173
5,661,506 A   8/1997 Lazzouni et al.
5,672,852 A * 9/1997 Fukuzaki et al. ........ 178/18.07

(Continued)

FOREIGN PATENT DOCUMENTS

JP      10-105325 A    4/1998

(Continued)

OTHER PUBLICATIONS

Howe, D., The Free On-line Dictionary of Computing, c 1993-2004, Dictionary.com.*

(Continued)

*Primary Examiner*—Chante Harrison
(74) *Attorney, Agent, or Firm*—Birch, Stewart, Kolasch & Birch, LLP

(57) ABSTRACT

An electronic pen for recording of handwritten or hand-drawn information has a control unit and a memory. The control unit registers pen movements across at least one base, stores a plurality of digital pen strokes in the memory as a function of said movements, and supplies a set of the digital pen strokes for processing. The digital pen strokes include a first type, which is processed as graphical information constituting the information to be recorded, and a second type, which is processed as instructions for the processing of digital pen strokes of the first type. The electronic pen may detect a current working session of the pen. The control unit indicates, for the processing of the set of digital pen strokes, the working session during which the respective digital pen strokes have been input.

22 Claims, 5 Drawing Sheets

U.S. PATENT DOCUMENTS

| | | | |
|---|---|---|---|
| 5,784,504 A * | 7/1998 | Anderson et al. | 382/309 |
| 5,790,114 A * | 8/1998 | Geaghan et al. | 345/179 |
| 5,852,434 A | 12/1998 | Sekendur | |
| 6,262,719 B1 * | 7/2001 | Bi et al. | 345/179 |
| 6,587,587 B2 * | 7/2003 | Altman et al. | 382/181 |
| 6,924,790 B1 * | 8/2005 | Bi | 345/179 |
| 7,225,402 B2 * | 5/2007 | Silverbrook et al. | 382/187 |
| 2002/0000981 A1 * | 1/2002 | Hugosson et al. | 345/179 |
| 2002/0041271 A1 * | 4/2002 | LeKuch et al. | 345/173 |
| 2004/0075650 A1 * | 4/2004 | Paul et al. | 345/173 |
| 2005/0093845 A1 * | 5/2005 | Brooks et al. | 345/179 |
| 2005/0166146 A1 * | 7/2005 | Silverbrook et al. | 345/179 |
| 2007/0122065 A9 * | 5/2007 | Silverbrook et al. | 382/313 |

FOREIGN PATENT DOCUMENTS

| | | |
|---|---|---|
| WO | WO 00/73887 A1 | 12/2000 |
| WO | WO 00/73983 A1 | 12/2000 |
| WO | WO 01/16691 A1 | 3/2001 |
| WO | WO 01/26032 A1 | 4/2001 |
| WO | WO 01/26033 A1 | 4/2001 |
| WO | WO 01/48591 A1 | 7/2001 |
| WO | WO 01/48685 A1 | 7/2001 |
| WO | WO-01/61455 A1 | 8/2001 |
| WO | WO 01/63393 A1 | 8/2001 |
| WO | WO 01/71471 A1 | 9/2001 |
| WO | WO 01/71473 A1 | 9/2001 |
| WO | WO 01/95091 A1 | 12/2001 |
| WO | WO 02/093467 A1 | 11/2002 |

OTHER PUBLICATIONS

XP002328425: Dymetman and Copperman, Intelligent Paper, Xerox Research Center Europe; published in Apr. 1998.

* cited by examiner

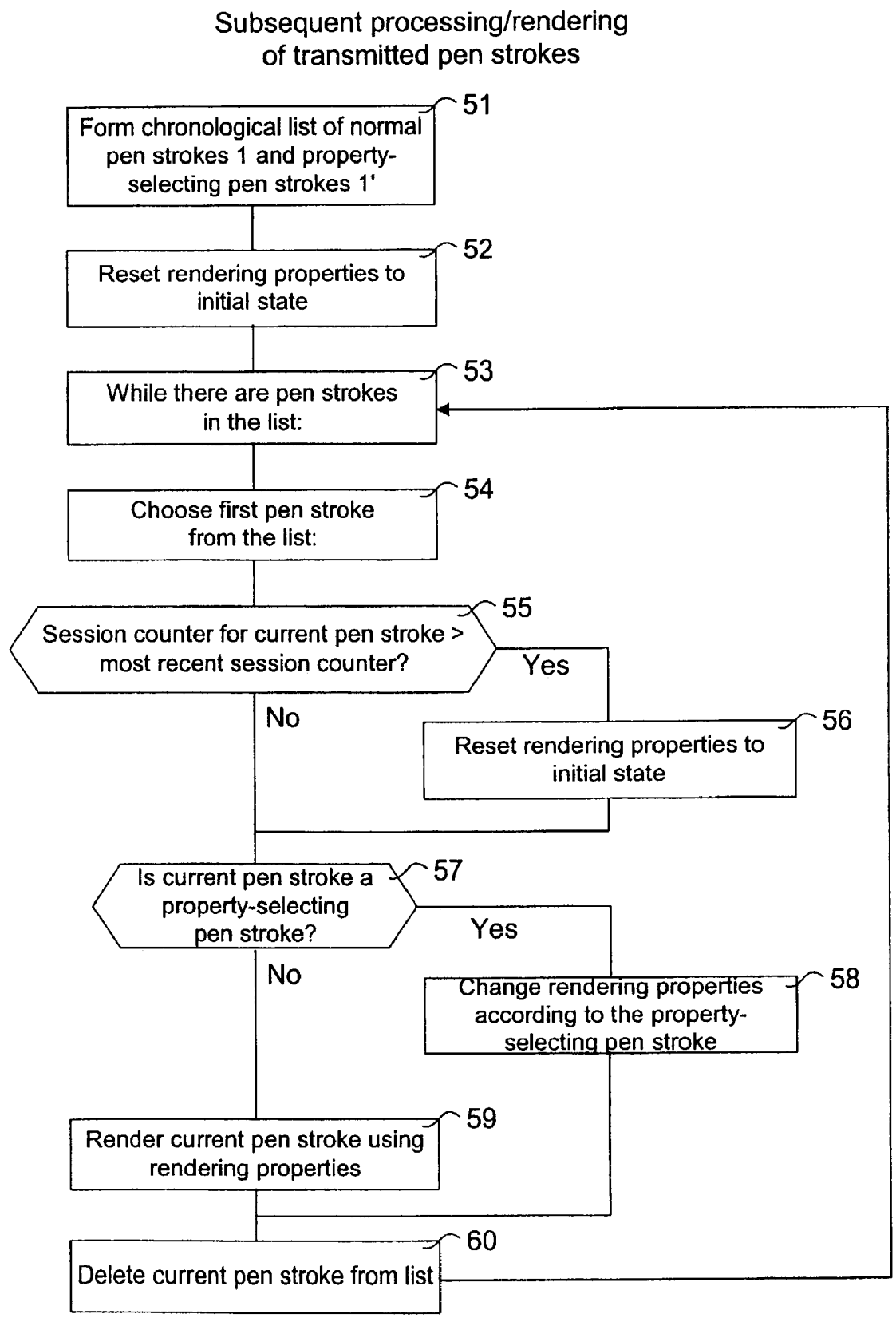

ELECTRONIC PEN AND METHOD FOR RECORDING OF HANDWRITTEN INFORMATION

This application claims priority on provisional Application No. 60/339,312 filed on Dec. 12, 2001, the entire contents of which are hereby incorporated by reference.

TECHNICAL FIELD

The present invention relates to electronic recording of handwritten or hand-drawn information by means of an electronic pen which is moved in desired pen movements across at least one base. More particularly, the invention relates to such electronic recording in which the pen movements are registered as a plurality of digital pen strokes that are either of a first type, which is intended to be processed as graphical information constituting the information to be recorded, or a second type, which is intended to be processed as instructions for the processing of digital pen strokes of the first type.

BACKGROUND ART

Input systems for inputting handwritten or hand-drawn graphical information into a computer are widely used together with different types of graphics software, for example CAD programs or web design programs. These input systems include a drawing device, and also a base or support for the latter. The drawing device can consist of an electronic pen which is intended to be held in a user's hand and is moved in desired pen movements across the base for inputting graphical information, such as handwriting, drawings, geometric figures, graphical patterns, symbols, numbers or the like. WO 01/71473 describes the use of such an electronic pen.

In this connection it is desirable to increase the user's possibilities of acting on the appearance of the graphical information produced or on other properties associated with the graphical information. Thus, in many applications it is necessary, or at least expedient, for the user to be able to specify purely graphical properties such as line thickness, line color, and the choice between solid, broken or dotted lines. The selectable properties for the graphical information can also be of a more advanced character, for example properties which allow the graphical information to look as if it has been produced by a special pen, such as a calligraphy pen, or by means of an airbrush technique. The selectable properties can also concern whether certain graphical information is intended to be visible or invisible or can simply indicate that particular information is intended to be read only by a certain recipient or group of recipients.

There are traditional ballpoint pens with which it is possible to write with ink in different colors. Such multicolor pens comprise a set of buttons which are arranged on the pen and are used to select the desired color. It would be obvious to transfer this principle of choice of properties to electronic pens too. However, this has the disadvantage that the user usually has to change grip in order to be able to access the button which is to be depressed to obtain a desired property (e.g. color). A further disadvantage of this solution is that the number of buttons which it is possible to incorporate on a pen is limited.

The problem of being able to make a large number of selections using a limited number of buttons has of course been solved in other types of handheld electronic appliances, for example mobile phones, by introducing screen-based menu systems. However, the narrow and elongate shape of an electronic pen can only provide a small accessible area for a display, and hence a menu system solution is less suitable for this type of product. A menu system would in any case not represent an optimum user interface for a pen because the user has to move or turn the pen round in order to be able to view the display and access the operating buttons for the menu system.

A better way of making it possible for the user to select a property from among a large number of properties without substantially changing his grip on the pen is instead to use a property palette placed on the base, that is to say an area comprising partial areas or selection fields, the meaning of which is pre-defined in the pen. For example, a certain selection field in the palette can signify the color red, and the pen stores the subsequent input with the color red property.

The advantage of this procedure is that it resembles an intuitive method of producing graphical information, but the solution has a serious disadvantage in its lack of flexibility. When the definitions of different selection fields have been programmed into a pen, it is difficult to increase the number of properties because the pen's memory is limited. In addition, changing the definition of a certain property requires reprogramming of the pen, and, if several different palettes are to be used, extensive and regular reprogramming of the pen is required, which complicates the construction of the pen.

In a more flexible solution, instead of storing the meaning of each pen stroke in the electronic pen, all definitions and interpretations of pen strokes on palettes and also on conventional writing surfaces are handled in a remote server with which the pen can communicate. The advantage of this solution is that it is much easier to reprogram a server for interpretation of certain properties than to reprogram a large number of pens.

The solution indicated in the previous paragraph is described in more detail in WO 01/71473 which relates to an arrangement for inputting graphical information into a computer system, the graphical information arising when a drawing device is moved in relation to a base which is provided with a position-coding pattern. The drawing device is arranged to record positions on the base, and a computer system connected to the pen is arranged to interpret position information from a first area as graphical information, and position information from a second area as control information concerning a visual property,of the graphical information. Examples of such properties are line thickness and line color.

The inventors of the present invention have now realized that there is a problem with a solution according to the previous paragraph: when a user of an electronic pen with selectable properties begins a new session of producing graphical information by means of the pen, said user cannot always remember the most recently selected settings from the most recently preceding writing session. This can happen, for example, in cases where a long period of time has elapsed since the last time the electronic pen was used.

An intuitive solution to this problem would be to provide the user with feedback concerning the selected properties via a user interface on the pen. However, because of the desired configuration of an optimum electronic pen, especially given the requirement for a low weight and an elongate shape for user-friendly handling, and also given the requirement in respect of a low price, the possibilities of constructing a user interface are limited. In addition, any property settings would either need to be stored locally in some way in the pen (which is not desirable for the above reasons) or transferred to the pen from the server.

The inventors of the present invention have also realized that there is another problem associated with the fact that it is often advantageous to provide the writing support in an arrangement like a book, file or notepad, where a number of "empty" input pages of paper are supplemented with a property palette which is either printed on a separate page of paper or on a special part of the input pages. A property selection on the palette page can and will then affect all subsequent inputs on the input pages, regardless of which page this takes place on. It is necessary in this connection to transfer all pen strokes input on the palette page to the server so that the latter is able to process (render) the pen strokes on the input pages in the correct way. This procedure can therefore involve transmitting large amounts of information on pen strokes from the palette page to the server, and this in turn has disadvantages in terms of long transmission times, costs associated with these long transmission times, high power consumption in the pen, and the need for large storage capacity in the server.

SUMMARY OF THE INVENTION

An object of the invention is to solve the above-described problems of recording graphical information by means of an electronic pen. A particular object of the invention is to make available a common solution to the various and apparently completely different problems which have been discussed above.

These objects are achieved with an electronic pen; a system and a method for electronic recording of handwritten or hand-drawn information; a method for processing such handwritten or hand-drawn information; a computer program product; and use of an electronic pen in accordance with the appended independent claims.

A first aspect of the invention is therefore an electronic pen for recording of handwritten or hand-drawn information, comprising a control unit and a memory. The control unit is arranged to register pen movements across at least one base, to store a plurality of digital pen strokes in the memory as a function of said movements, and to supply a set of the digital pen strokes for processing. The digital pen strokes include a first type, which is intended to be processed as graphical information constituting said information to be recorded, and a second type, which is intended to be processed as instructions for the processing of digital pen strokes of the first type. The electronic pen further comprises session-determining means adapted to detect a current working session of the pen. The control unit is arranged to indicate, for the processing of said set of digital pen strokes, the working session during which the respective digital pen strokes have been input.

Such a pen makes it possible to solve the above-described problems, namely of ensuring that a user of an electronic pen with selectable properties cannot always remember the most recently selected settings of the pen. By way of detecting, according to the invention, the different working sessions during which the different digital pen strokes have been input, it is possible, in the subsequent processing of the registered pen strokes, to automatically restore the pen's settings to an initial or default state as soon as it is identified that a change-over between working sessions has taken place. This has the great advantage that the person using the pen does not have to worry about how the pen settings appeared during the preceding working session; in the subsequent processing, the pen settings are at all times considered as having been reset to the initial or default state at the start of a new working session.

The registered pen strokes may either be transmitted to a remote processing device, such as a server, for processing therein, or be processed by local processing means in the pen. In the former case, the pen will comprise a transmitter for communication with the remote processing device. In the latter case, the local processing means may be implemented as software code executed by the control unit. A combination of these alternatives is also possible, such that the pen will contain one instance of a (local) processing device (implemented by said local processing means) and also communicate with a second (remote) instance of a processing device.

With a pen as described above it is also possible to solve the problem of avoiding unnecessary transmission and/or processing of information concerning the selection of pen stroke properties. For this purpose, with regard to transmission to a remote processing device or processing locally in the pen as the case may be, the control unit in the pen is arranged to cause only such digital pen strokes of the second type to be processed, which originate from working sessions for which there are digital pen strokes of the first type included in said set.

The pen can advantageously comprise a session counter which is stored in the memory and which is incremented by the control unit when the session-determining means has detected that a new working session has been initiated, wherein the control unit stores the digital pen strokes together with the session counter values applying at the time of input of the respective pen strokes, and wherein the control unit is arranged to use these values when determining which digital pen strokes of the second type are to be processed.

The control unit can alternatively be arranged to note the times at which new working sessions are initiated, to store these times and to use them when determining which digital pen strokes of the second type are to be processed.

The session-determining means can comprise a mechanical, optical, electrical or magnetic switch which is connected to said control unit. In the case where the pen comprises not only a pen body but also a protective cap, the switch can advantageously be placed so as to detect that the protective cap is removed from the pen body.

Said second type of digital pen strokes may represent at least one property of said first type of digital pen strokes. Such a property may be a visual graphic property such as color, thickness, pattern or visibility. It may also be a temporal or spatial resolution for the pen strokes—either the resolution with which the pen strokes are registered or the resolution with which they are to be rendered during processing. The property may also relate to a background for the pen strokes; it may for instance designate a certain background image, pattern or color, It may even relate to a property of the background itself, for instance whether pen strokes are to act in an overwriting manner or an erasing manner.

Furthermore, the property may relate to a context to which the pen or its user belongs, such as a certain user, group, company, shop, book, etc. The property may also be an indication of restricted access to the pen strokes. As used herein, "indication of restricted access" may mean limited or full access for a reader to pen strokes which would otherwise be less accessible, or not accessible at all, had said indication not been given. "Indication of restricted access" may also mean less access to pen strokes than if said indication were not given.

Moreover, said second type of digital pen strokes may represent at least one command for affecting an interpretation of digital pen strokes of said first type. Such interpretation may involve character recognition, wherein said command causes a plurality of pen strokes to be interpreted in a specified manner, for instance as a text, a sequence of characters, a sequence of digits (such as a telephone number or bank account), a sequence of upper-case characters, a sequence of lower-case characters, or an address for electronic communication (such as email). The command may also serve to define a certain page format parameter such as page break, page column or page margin.

Alternatively, the interpretation may involve geometrical object recognition, wherein said command causes a plurality of pen strokes to be interpreted in a specified manner, for instance to be matched with an ideal geometrical shape such as a circle or a polygon.

As yet an alternative, the second type of digital pen strokes may represent a command to the processing means/remote processing device itself, for instance to "manually" reset the pen settings to an initial or default state by commanding a new working session.

A second aspect of the invention is a system for electronic recording of handwritten or hand-drawn information, comprising an electronic pen which is intended to be moved in desired pen movements across at least one base and to register the pen movements as a plurality of digital pen strokes, and a processing device for receiving registered digital pen strokes from the electronic pen, the digital pen strokes including a first type and a second type as stated above. In the same way as in the first aspect, the electronic pen comprises session-determining means adapted to detect a current working session of the pen. Upon transmission of the digital pen strokes to a processing device, the pen is arranged to indicate during which working session the respective digital pen strokes have been input. Upon processing of the digital pen strokes, the processing device is arranged to detect that a certain digital pen stroke is indicated as having been input during a different working session than a preceding digital pen stroke and, as a consequence of this, to restore the property for successive digital pen strokes of the first type to an initial or default state. As used herein, "a preceding digital pen stroke" may be an earlier registered pen stroke or an earlier processed pen stroke.

A third aspect of the invention is a method for recording of handwritten or hand-drawn information originating from an electronic pen as stated above. The method comprises the steps of a) detecting the working session of the pen during which the respective digital pen strokes are recorded, b) determining the working session(s) during which a plurality of digital pen strokes of said first type were recorded; and c) supplying for processing only such digital pen strokes of said second type which have been recorded during the working session(s) determined in step b).

A fourth aspect of the invention is a method for processing of handwritten or hand-drawn information of the above-mentioned types. According to this method, a set of recorded digital pen strokes are processed as follows:

a digital pen stroke of the second type determines a current property of digital pen strokes of the first type;

digital pen strokes of the first type are assigned the current property; and if a certain digital pen stroke is indicated as having been recorded during a different working session of the electronic pen than a preceding digital pen stroke, the current property is reset to an initial or default state.

A fifth aspect of the invention is a computer program product which can be directly loaded into a memory belonging to a processor and which comprises program code for carrying out the steps according to the fourth aspect of the invention.

A sixth aspect of the invention consists in use of an electronic pen according to the above for defragmenting or so-called garbage collection of the pen's memory.

The second to sixth aspects of the invention have essentially the same advantages as the first aspect.

Other objects, advantages and features of the invention are set out in the following detailed description of the invention, in the attached claims and in the drawings.

BRIEF DESCRIPTION OF THE DRAWINGS

The invention will now be described in more detail with reference to the accompanying drawings, in which.

DETAILED DESCRIPTION OF THE INVENTION

An overview of the various components of the invention will first be given. This will be followed by a detailed account of those aspects which may be central to the invention.

Figure 1:
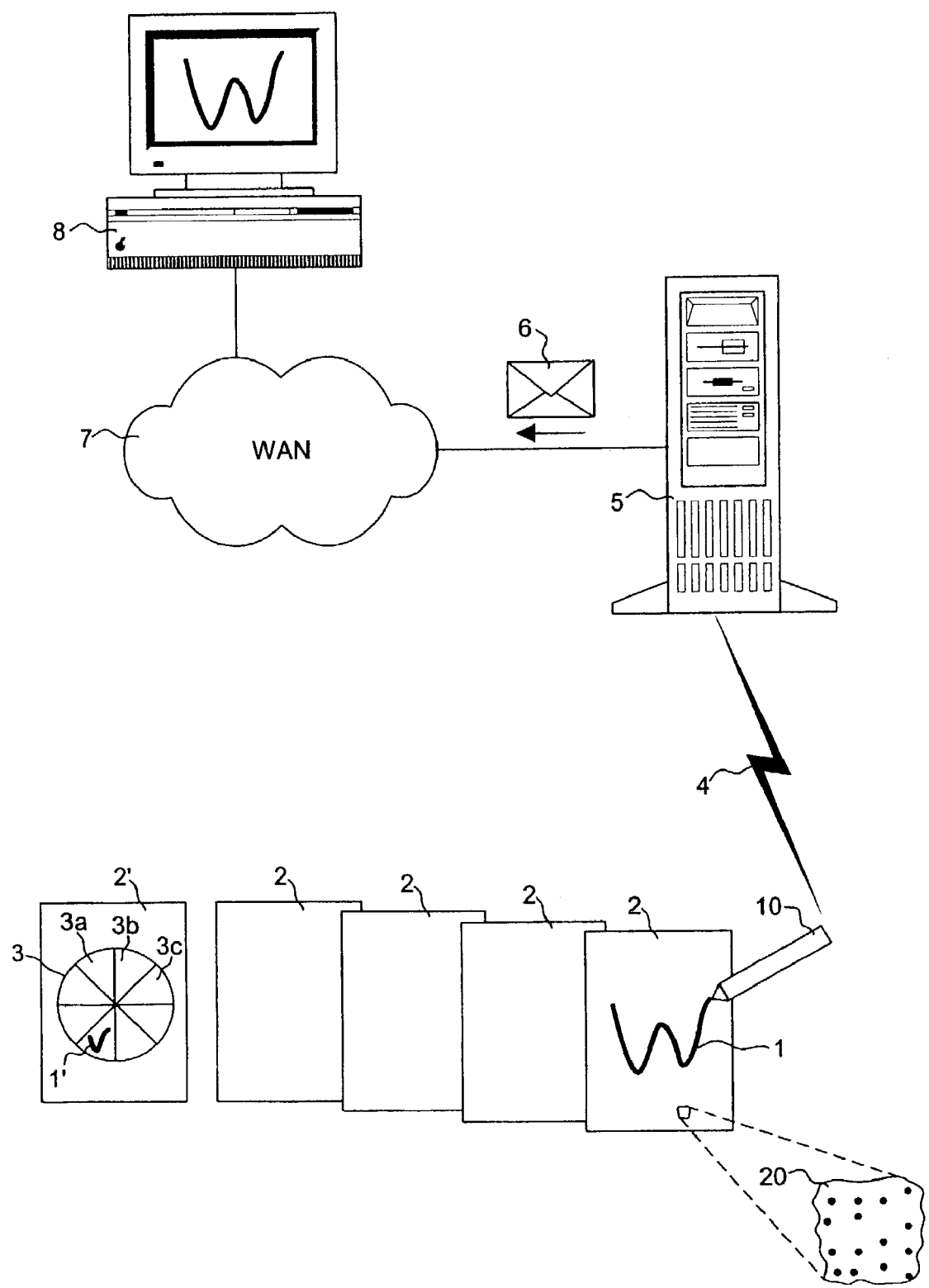
FIG. 1 is a schematic overview of a system for electronic recording of handwritten or hand-drawn information according to an embodiment comprising, inter alia, an electronic pen and a server for receiving graphical information input from the pen.

A preferred embodiment of a system for electronic recording of handwritten or hand-drawn information is shown in FIG. 1. The system uses an electronic pen 10 which will be described in more detail with reference to FIGS. 2 and 4. When the user moves the pen 10 in desired pen movements 1 across a writing base, the pen movements are recorded as a plurality of digital pen strokes which are stored locally in the pen in order to await subsequent transmission to a server 5 via a wireless communication link 4. To permit this recording, the writing base is provided with a position-coding pattern 20 which will be described in more detail with reference to FIG. 3. One possible application, among a large number of such applications, is one in which the graphical information input via the pen movements 1 is added to or enclosed with an e-mail message 6 which is transmitted via a wide area network 7 (WAN), for example the Internet, to a receiving computer 8 nominated by the person using the pen. For this purpose, the server according to FIG. 4 comprises a main processor (CPU) 27, a working memory (RAM) 28 connected thereto, a secondary memory 29, a transceiver 26 for wireless communication with the pen 10 via the link 4, and a WAN interface 30 (for example a network card and/or other necessary equipment to be connected to the wide area network 7). In addition to storing the normal operating system, the secondary memory 29 also stores application software consisting of a set of program instructions which, when loaded into the working memory 28, can be executed by the main processor 27 in order to carry out the methods according to the invention described below.

In the preferred embodiment shown in FIG. 1, the writing base for the pen 10 is in the form of an arrangement similar to a book, file or notepad and is divided into, on the one hand, a number of initially empty input pages 2 of paper and, on the other hand, a property palette 3 which in this case is printed on a separate page of paper 2' but could alternatively appear in a special partial area on the input pages. By making a pen stroke 1' in one of the partial fields 3a-c in the property palette 3, the user can select the desired property for subsequent "normal" pen strokes 1 on the input pages 2.

The properties that can be selected using the palette 3 can include, inter alia, purely stylistic properties for the graphical input 1, such as line thickness, line color or pattern (e.g. choice between solid, broken or dotted lines). The selectable properties can also include more advanced properties, for example those which make the graphical information look as if it has been produced using a special pen such as a calligraphy pen or by an airbrush technique. The properties can also concern whether certain graphical information is to be visible or not visible, or alternatively can indicate that the information in question is intended to be read only by a specific recipient or group of recipients.

In this embodiment, the digital pen strokes recorded with the aid of the electronic pen 10 can therefore, in summary, be of a first type (normal pen strokes 1) which will be processed by the server as purely graphical information, and a second type (property-selecting pen strokes 1') which will be processed by the server as an indication of a property of the digital pen strokes of the first type. An input system substantially corresponding to that in FIG. 1 is described in detail in WO 01/71473, which in its entirety is incorporated herein by reference.

Figure 2:
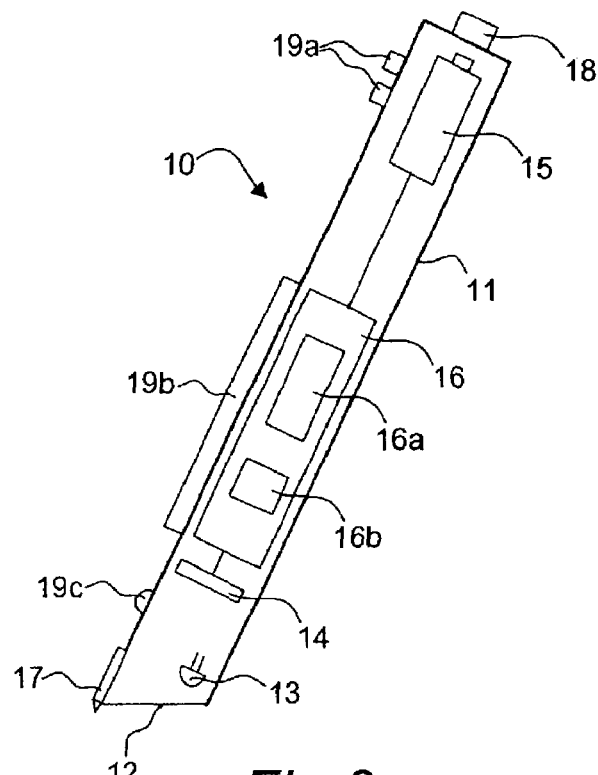
FIG. 2 is a schematic view of the electronic pen in FIG. 1.

Referring to FIG. 2, a brief description will now be given of the general component parts of the electronic pen 10. A more complete description of the pen 10 is given in WO 01/16691, WO 01/26032 and WO 01/26033, which in their entirety are incorporated herein by reference.

The electronic pen 10 has a casing or pen body 11 which has approximately the same design as the casing of a conventional highlighter pen. One short side of the casing has a window 12 through which images are recorded. The casing 11 principally comprises an optics part, an electronics part and a power source.

The optics part comprises at least one illuminating light source 13, a lens system (not shown in the figure), and an optical image sensor 14. The light source 13, preferably a light-emitting diode, preferably uses infrared light, or alternatively light of another wavelength, to illuminate a part of the base 2 which lies within sight of the window 12. The base 2 is provided with the position-coding pattern 20. An image of the base 2 will be projected via the lens system onto the image sensor 14.

The power source for the sensor device 10 is advantageously a battery 15, which alternatively can be replaced by or supplemented by mains power (not shown).

The electronics part 16 comprises a control unit 16a with a storage means 16b connected to it. The control unit 16a is responsible for the various functions of the electronic pen 10 and can advantageously be implemented using a commercially available micro-processor such as a central processing unit (CPU), a digital signal processor (DSP) or another programmable logic device such as an FPGA, or alternatively an application-specific integrated circuit (ASIC), as discrete analog and digital components, or a combination of the above.

The storage means 16b preferably comprises different types of memories such as a working memory (e.g a RAM) and a program code and persistent storage memory (e.g. a flash memory). Associated programs are stored in the storage means 16b and executed by the control unit 16a in order to carry out the functions of the electronic pen 10.

A conventional pen point 17 is arranged on the casing 11. With the pen point 17, the user can write or draw physically (visually) on the base 2 by means of a conventional pigment-based marker fluid being deposited on the surface. The marker fluid in the pen point 17 is preferably transparent to infrared eight in order to avoid interference with the opto-electronic detection in the electronic pen 10.

The electronics part additionally comprises a combined transmitter and receiver (transceiver) 18 for transfer of information to or from a remote apparatus, such as a computer or mobile phone, but mainly for information transfer to the server 5. The combined transmitter and receiver 18 is advantageously adapted for short-range radio communication in accordance with the Bluetooth standard at 2.4 GHz on the ISM (Industrial, Scientific and Medical) frequency band. However, the combined transmitter and receiver can alternatively be adapted for infrared communication, such as IrDA (Infrared Data Association), or for cable-based communication (such as USB or RS232), or basically for any other available standard for short-range communication between a handheld device and a remote device.

Although the information transfer in the preferred embodiment takes place directly between the pen 10 and the server 5, it should be noted that this can just as well take place via an intermediate device, for example a mobile phone, a hand-held computer or a portable PC. In this case, the intermediate device is provided with a combined transmitter/receiver corresponding to the transmitter/receiver 18 in the pen 10, and information can be transferred from the pen to the intermediate device. The latter is further provided with a suitable interface for communication with the server 5, for example a network card (for communication via a local or wide area network), or alternatively an analog or digital modem (for communication via a cable-based fixed telecommunications network, a mobile telecommunications network or a satellite telecommunications network). In this way, the information from the pen can be conveyed onwards to the server 5 by this intermediate device.

In addition, the electronics part can comprise buttons 19a by means of which the user can control the functions of the electronic pen 10. The electronic pen 10 can also include a screen 19b, such as a liquid crystal display, and a status-indicating light 19c.

Figure 3:
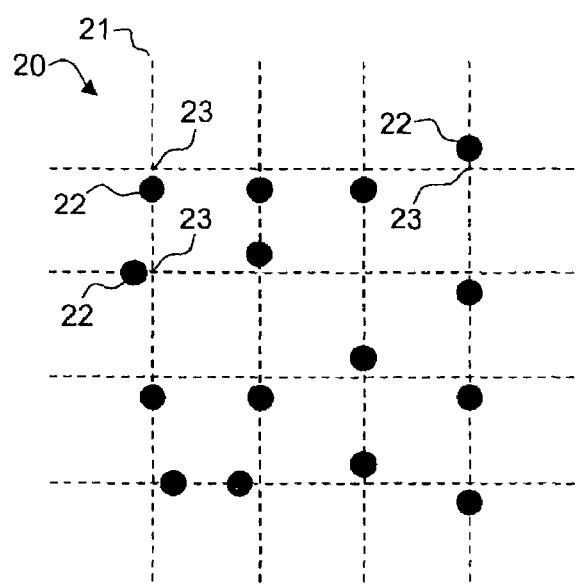
FIG. 3 is a schematic view of a position-coding pattern which is applied on the writing bases for the electronic pen in FIG. 1.
Figure 4:
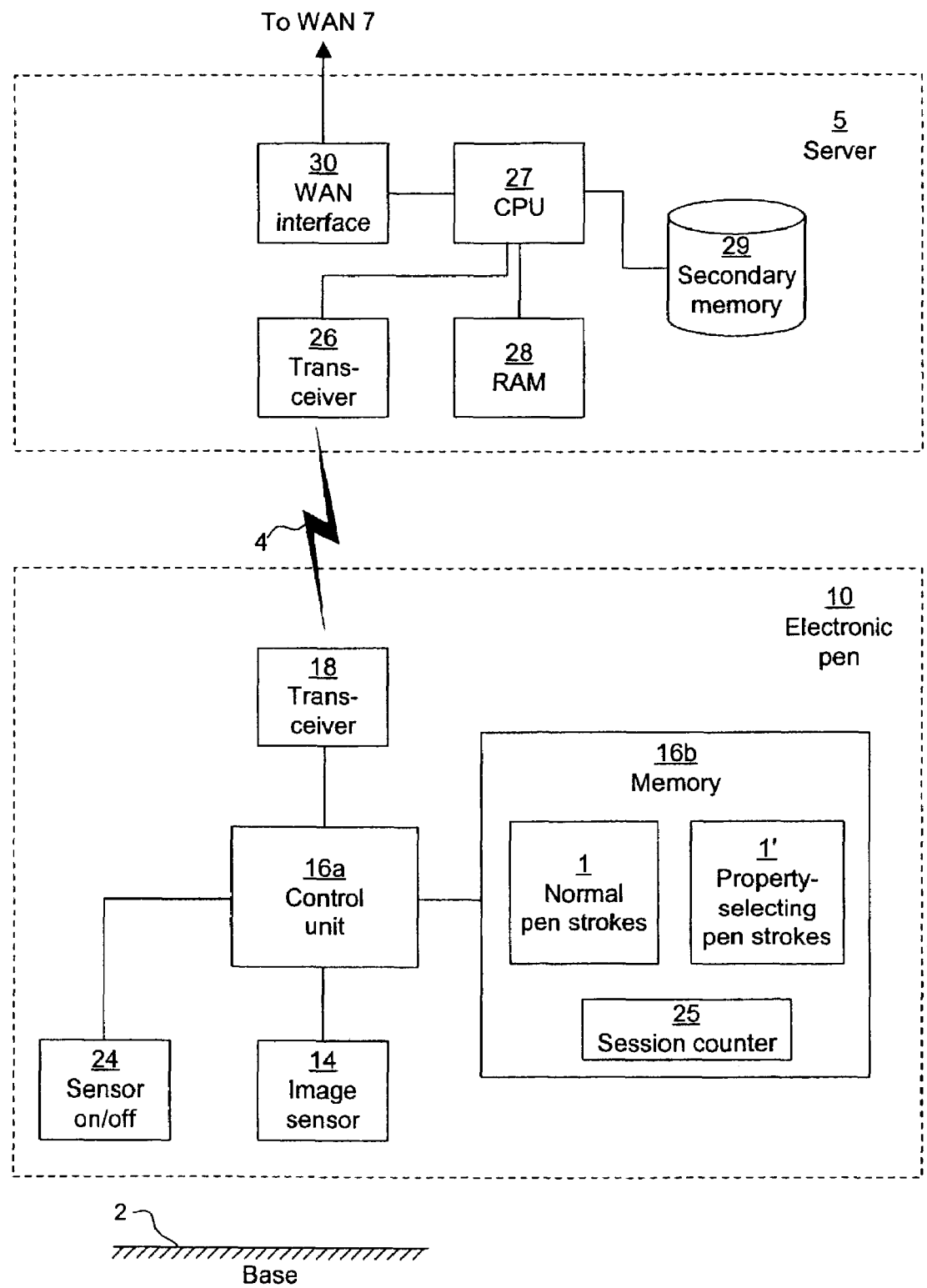
FIG. 4 shows the block diagrams of the electronic pen and server in FIG. 1, and FIGS. 5 and 6 are flow charts of possible operating methods for the invention.

Referring to FIG. 3, the position-coding pattern comprises a virtual raster pattern 21 about which a number of marks 22 are formed. Each mark represents one of four possible values from 1 to 4. The value of each mark is represented by its actual position 22 in relation to its nominal position 23, the latter being at the intersection between a horizontal line and a vertical line in the raster pattern 21. Thus, each mark 22 can be situated in one of four different positions which are separate from each other in orthogonal directions from the nominal position 23. The distance is preferably not less than ⅛ and not more than ¼, preferably ⅙, of the distance between two opposite raster lines.

The distance between the raster lines can, for example, be 300 micrometers or 254 micrometers. The latter distance is especially suitable for printers and image sensors which often have a resolution which is a multiple of 100 dpi (dots per inch).

Each mark 22 consists of a substantially circular dot having a radius which is preferably between 25% and 120% of the distance between the dots and the nominal position 23. Alternatively, the marks 22 can have geometric shapes which are other than circular, for example rectangular, triangular or elliptic, and they can also be solid or open.

The position-coding pattern 20 can be constructed in such a way that it codes a very large number of absolute positions. For example, 6×6 contiguous markings in combination can code a position with x and y coordinates. By providing the surface of the base 2 with the position-coding pattern 20, an electronic representation of the information written or drawn on the base can be obtained by the electronic pen 10 by means of repeatedly producing images of the surface when the pen 10 is moved across the surface. In these images, the marks 22 will appear as foreground objects, while the rasters 21 are only virtual and will not appear in the images.

Position-coding patterns of the type outlined above are described in more detail in WO 01/16691, WO 01/26032 and WO 01/26033. An alternative position-coding pattern is shown in WO 00/73983. All these documents are incorporated in their entirety herein by reference.

To achieve the objects of the invention, the electronic pen 10 has been provided with session-determining means for detecting a current working session of the pen and for saving information about the current working session together with the input graphical information 1, 1'. As can be seen from FIG. 4, in the preferred embodiment this session-determining means is realized as a sensor 24 for detecting the switching on/off of the pen 10, in combination with a session counter 25 and general control from the control unit 16*a*. The sensor 24 is advantageously a mechanical, optical, electrical or magnetic switch with the aid of which a well-defined event can be detected, for example the user switching on/activating the pen by means of a button 19*a* provided for this purpose.

In the preferred embodiment, however, the sensor 24 is arranged to detect when a protective cap (not shown) on the short side 12 of the pen is removed from said pen in order to start a new writing session. In this case, the sensor 24 can advantageously be realized by a Hall-effect element or another element susceptible to magnetic fields which is able to detect the presence (when the protective cap is placed on the pen, which then assumes a switched off/deactivated state) and the absence (when the protective cap is removed from the pen, which is then switched on/activated) of a magnet placed in the protective cap. A suitable sensor for the above purpose is described in Applicant's published International Patent Application WO 02/093467 which in its entirety is incorporated herein by reference.

Each time the control unit 16*a* detects via the sensor 24 that the pen has been switched on/activated prior to a new working session (for example, by the user removing the protective cap from the pen), the control unit will increment the value of the session counter 25. In the preferred embodiment, the session counter 25 can represent a 32-bit number, which is a very high number in this context; in the unlikely event of the user switching the pen on as much as once a second, the session counter 25 will overflow only after approximately 136 years.

After recording, all the digital pen strokes stored in the memory 16*b* (normal pen strokes 1 and property pen strokes 1') will be stored together with the current value of the session counter 25. More particularly, in the preferred embodiment, the following storage format for pen strokes is used:

Pen stroke header→Offset→Start time→Page address→Session counter→[coordinate stream], where:

Pen stroke header includes miscellaneous control information for error handling, storage format, data compression and the like;

Offset provides a value of the length, in number of bits, of the current pen stroke in relation to the start of the next pen stroke;

Start time is self-explanatory and can be given either as an absolute value or as a difference value in relation to the preceding start time;

Page address ensures that each pen stroke is unambiguously allocated to an individual base 2/2' in a possibly hierarchical structure of pages;

Session counter is the current value of the session counter 25, expressed as an absolute or differential (relative) number; and

[coordinate stream] represents the information load (payload) and comprises a sequence of absolute or relative-coded x and y coordinates for sampled positions of movements of the pen, i.e. pen strokes 1/1', on the base 2/2'.

According to the invention, all recorded pen strokes are thus allocated to a certain working session of the pen 10, represented by the value of the session counter 25 applying at each time. The fact that the working session is known for all stored pen strokes is then made use of in order to achieve the object of the invention, as will be described in detail below. More particularly, session allocation is used, on the one hand, to minimize the necessary transmission of property-selecting pen strokes 1' to the server 5, and, on the other hand, to obtain automatic resetting of selected pen properties in the case where a new working session has been started.

Figure 5:
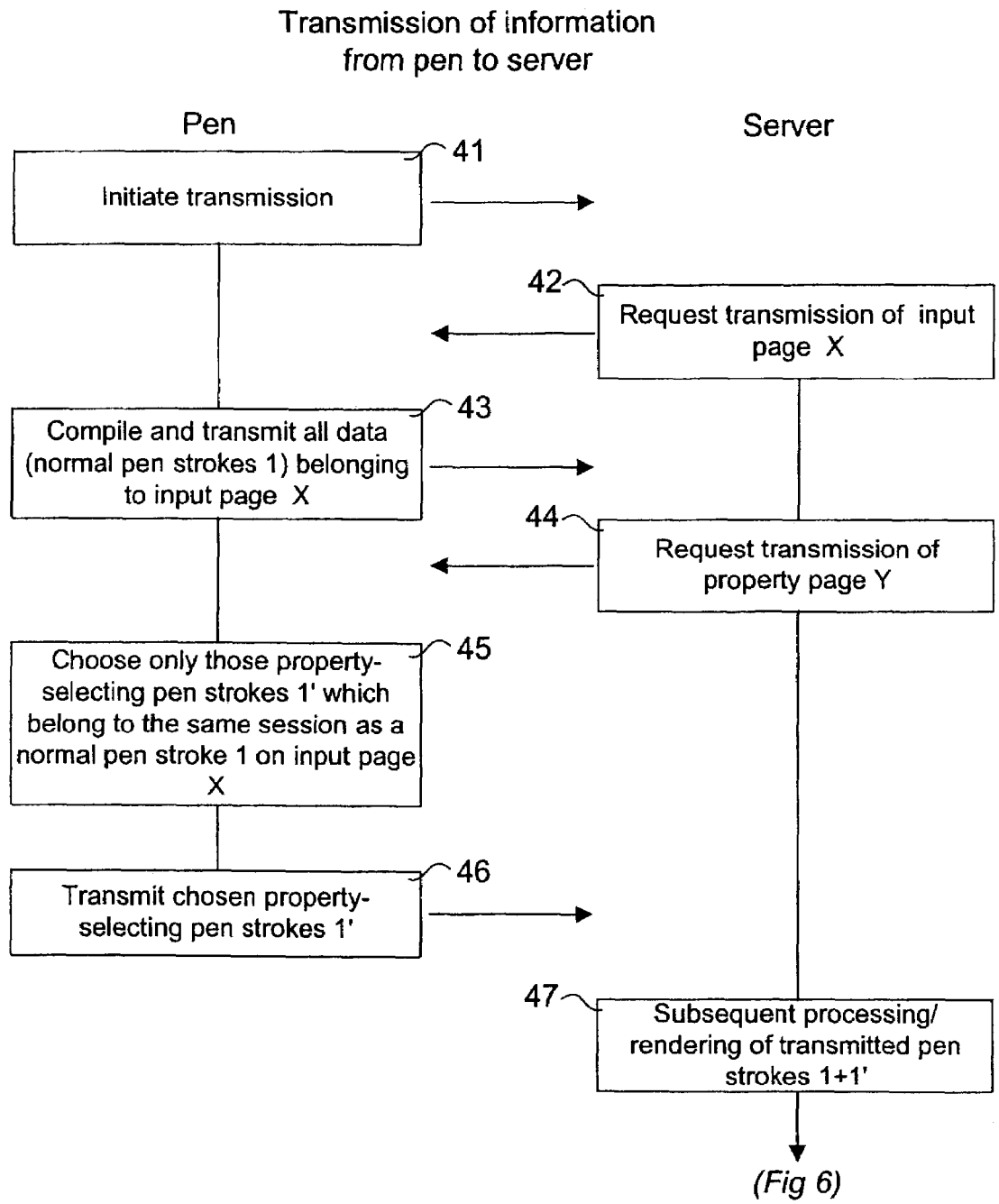

FIG. 5 illustrates a procedure for transmission of recorded pen strokes from the pen 10 to the server 5. In an initial step 41, the transmission procedure is initiated by an active measure on the part of the user, for example by the latter using the pen 10 to cross or tick off a special SEND field on the current base 2 and/or ordering transmission using one of the buttons 19*a*. Alternatively, the transmission could be initiated automatically, for example when a predetermined period of time has passed since a pen stroke was last input, or when the memory 16*b* in the pen 10 has reached a certain degree of filling. Step 41 is ended by the pen 10 sending a transmission request to the server 5 via the wireless link 4.

As a result of this, the server 5 in step 42 orders transmission of a certain input page X, normally the page on which the user marked the SEND field.

In step 43, the control unit 16*a* in the pen 10 goes through all the normal pen strokes 1 stored in the memory 16*b* and compiles the normal pen strokes which belong to the current input page X. At the same time, the control unit 16*a* notes which session counter values appear for the compiled normal pen strokes 1. The control unit 16*a* either saves a complete list of all the occurring session counter values or registers their minimum and maximum values. Moreover, the control unit 16*a* preferably sorts the compiled normal pen strokes 1 into chronological order (according to the Start time parameter in the storage format) before the compiled pen strokes are transmitted to the server 5 at the end of step 43.

In step 44, the server then requests transmission of the property-selecting pen strokes 1' which are stored on the property page/palette page Y (i.e. the base 2' and the palette 3 in FIG. 1) and which are needed for subsequent processing/rendering of the normal pen strokes 1 on the input page X. Steps 43 and 44 may alternatively be performed in the opposite order.

Since the property page/palette page Y probably also contains property-selecting pen strokes 1' for other input pages 2 than just page X, according to the invention the relevant property-selecting pen strokes are extracted in the manner described below.

From all the property-selecting pen strokes 1' stored in the memory 16*b*, the control unit 16*a* in the pen 10 now chooses, in step 45, only those property-selecting pen strokes which have the same value, of the Session counter parameter, as one of the normal pen strokes 1 compiled in step 43, or chooses those property-selecting pen strokes which have a session counter value that falls within a range defined by registered minimum and maximum values, as the case may be. It is of course these property-selecting pen strokes alone which are needed for the subsequent processing/rendering, in the server 5, of the normal pen strokes 1 on the input page X. This results in a considerable reduction in the transferred data volume, in a subsequent step 46, compared with the situation if all the property-selecting pen strokes stored in the memory 16*b* were to be transmitted.

In step 47, the procedure moves on to the subsequent processing/rendering of the transmitted pen strokes. This subsequent processing/rendering takes place exclusively in the server 5 and is illustrated in FIG. 6.

In an initial step 51, a common, chronological list of the transmitted normal pen strokes and property-selecting pen strokes is formed. The rendering properties, for example line thickness, color, etc., which are to be applied by the server 5 to the normal pen strokes, are reset in step 52 to an initial or default state. Thereafter, a main loop is started in step 53. As long as there are pen strokes remaining in the list formed in step 51, the following takes place:

The uppermost (chronologically the first) pen stroke is read from the list in step 54. In step 55, a check is made to ascertain whether the Session counter parameter for this pen stroke has a higher value than for the last processed pen stroke. If so, this means that a new working session of the pen 10 was initiated between the recording of the most recent pen stroke and the current pen stroke, for which reason, in accordance with the previous discussion, the rendering properties have to be reset to an initial or default state in step 56. The initial or default state for the rendering properties can, for example, comprise "black color; normal line thickness; solid line".

If the response in step 55 is negative, the execution moves on directly to a new decision step 57 in which a check is made to ascertain whether the current pen stroke is a property-selecting pen stroke. If such is the case, this property-selecting pen stroke is analyzed in more detail in step 58. By comparing with pre-defined templates which can either be stored directly in the server's secondary memory 29 or can be obtained via the wide area network 7, the server 5 establishes the meaning of the partial field 3*a*-3*c* in the palette 3 on property page 3 in which the property-selecting pen stroke in question was made. The rendering properties are then changed in accordance with the established meaning; if the meaning of a particular partial field 3*a* is "color=red", the rendering properties are changed with respect to color, so that subsequent normal pen strokes are rendered in (i.e. given) the color red.

If the response in decision step 57 is negative, i.e. the current pen stroke is not a property-selecting pen stroke but instead a normal pen stroke, this normal pen stroke is rendered in a subsequent step 59 with the current rendering properties.

Finally, the pen stroke whose processing has now been finished may be deleted from the list or simply left as it is, and then the execution returns to step 53.

An alternative embodiment will now be described in brief. Instead of the session-determining means being a session counter 25 which is incremented each time a new working session is detected by the sensor 24, the control unit 16*a* in the pen 10 records on each occasion the time at which a new working session is detected. These times can be stored in a, possibly circular, reset list of intended resetting events.

Upon transmission of recorded pen strokes to the server 5, the control unit 16*a* in the pen 10 checks the minimum and maximum times (indicated by the Start time parameter) for pen strokes to be transmitted, in analogy with the minimum and maximum values of the Session counter parameter in the preferred embodiment described above. When a property page is then to be transmitted, the pen calculates a time window in accordance with the following. On the basis of the noted minimum time, the pen looks for the time in the reset list which most closely precedes the minimum time. This time defines the start of the time window, while the noted maximum time represents the end of the time window. The reason for the earlier start of the time window is that otherwise one might possibly omit to transmit a property-selecting pen stroke which has been input as the very first event in a new working session. The above can be illustrated as follows. Now assume that:

the reset list consists of the times:
$\{12, 16, 19, 200, 330\}$,
the normal pen strokes on the current page have the time stamps:
$\{18, 21, 32, 100, 120, 230\}$ and
the property page contains property-selecting pen strokes with the time stamps:
$\{1, 2, 3, 4, 6, 8, 9, 10, 12, 15, 20, 220, 500\}$.

This gives minimum time=18, maximum time=230 for the normal pen strokes. The minimum time is preceded by a resetting at the time 16, which gives the time window [16, 230]. The following are thus transmitted to the server 5:

Normal pen strokes=$\{18, 21, 32, 100, 120, 230\}$ (i.e. all of them).

Property-selecting pen strokes=$\{20, 200\}$ (i.e. only the ones within the time window).

Resetting events=$\{16, 19, 200\}$ (only those within the time window need to be transmitted to the server).

The subsequent processing/rendering takes place in substantially the same way as in FIG. 6; the three lists are combined to form a common chronological list in which a normal pen stroke is rendered according to the current rendering properties, a property-selecting pen stroke changes the rendering properties, while a resetting event resets the rendering properties to an initial or default state.

Instead of transmitting a separate reset list to the server in accordance with the above, it might be possible to flag resetting events in the form of pen strokes using a separate pre-defined meaning among the stream of normal pen strokes.

According to yet another alternative embodiment, the noted session counter values and resetting times can be used for defragmenting or so-called garbage collection of the memory 16*b* in the pen, so that property-selecting pen strokes are kept in the memory only if there is at least one normal pen stroke with the same session counter value, or only if the property-selecting pen stroke has a time stamp falling within a time window which is relevant for the normal pen strokes stored in the memory (in analogy with the above description of an alternative embodiment).

The session counter may be incremented or otherwise updated in various other ways than the ones described above. For instance, the user may enter a certain second-type pen stroke to request initiation of a new working session, wherein the session counter will be updated. Moreover, the pen may retrieve a control signal from an external device, such as the server 5, and update the session counter accordingly. Alternatively, the session counter may be updated at a given periodicity, such as every ten minutes, every hour, etc.

The embodiments described above involves a remote server 5 to which the registered pen strokes are transmitted for processing/rendering. As mentioned in a previous section of this document, however, the processing/rendering may alternatively, or additionally, be performed locally within the pen. Thus, the features of the invention in terms of handling of working sessions so as to achieve the objects and obtain the advantages of the invention are applicable to embodiments with local processing/rendering as well.

Moreover, the embodiments described above primarily concern use of the second-type pen strokes as property-selecting pen strokes for normal (first-type) pen strokes. However, as mentioned in a previous section of this document, the second-type pen strokes may more generally relate to instructions for the processing of the first-type pen strokes, or for the processing procedure itself. In addition to the examples of such instructions given in aforesaid previous section of this document, the second-type pen strokes may be used for indicating a desired interpretation context, either for subsequently entered (first-type) pen strokes in a certain working session or for all (first-type) pen strokes in a given situation (i.e., also previously entered ones), viewed as individual pen strokes or as a whole. For instance, the desired interpretation context commanded by a certain second-type pen stroke may relate to a telephone number, wherein the relevant first-type pen strokes (for instance the ones that are subsequently entered during the current working session until another second-type pen stroke is given) will be interpreted as digits 0-9 and possibly certain other characters such as "+" (for international dial code), "–" or "/".

Other examples of desired interpretation context may include a bank account number or another sequence of digits, an email address, a sequence of lower-case or upper-case characters, or a page format parameter such as page break, page columns or page margins. The desired interpretation context may also be that the (first-type) pen strokes in question are to be interpreted as character information (e.g. text) in general, instead of as pure graphical information.

A second-type pen stroke may also be used for defining that information entered in a certain area of the writing base is to be interpreted in a certain manner, for instance as an ICR (Intelligent Character Recognition) field. Following such a second-type pen stroke, the certain area itself may be defined by a sequence of second-type pen strokes designating e.g. the four sidewalls or the four corners of a rectangular area. The position and extension of such a certain area may alternatively be hard-coded (predefined), such that a certain second-type pen stroke is always associated with a certain predefined area of the writing base.

Such a certain area may alternatively be associated with an erasing operation, so that all entered pen strokes within the certain area are erased.

Moreover, a second-type pen stroke may serve as an "access-granting" stroke to declare that various externally stored personal data (e.g. social security or personal number, telephone number, bank account number) may be used as input data when processing a certain set of pen strokes.

All these alternative applications and meanings of second-type pen strokes may advantageously be used in conjunction with the other features of the invention, e.g. the aforedescribed handling of working sessions. They may, on the other hand, also be used without such handling of working sessions.

Generally, everything that has been described herein as regards entering, processing, transmission and interpretation of first-type pen strokes in relation to a particular second-type pen stroke may involve first-type pen strokes following the particular second-type pen stroke during a current working session, and/or preceding first-type pen strokes in the current working session, entered on the same page or different pages of a writing base, including a hierarchical writing base as is disclosed in WO 01/48685, which is incorporated herewith by reference.

The invention has been described above in the form of a couple of examples. However, the invention is not in any way limited to these, and instead it encompasses many other alternatives, as are defined by the scope of protection of the attached claims and will further be obvious to the person skilled in the art.

What we claim and desire to secure by Letters Patent is:

1. A system for electronic recording of handwritten or hand-drawn information, comprising:
    an electronic pen which is intended to be moved in desired pen movements across at least one base and to register the pen movements as a plurality of digital pen strokes; and
    a processing device for receiving registered digital pen strokes from the electronic pen, the digital pen strokes including a first type, which is processed by the processing device as graphical information constituting said information to be recorded, and a second type, which is processed by the processing device as an indication of a property of digital pen strokes of the first type,
    the electronic pen further comprising:
    session-determining means adapted to detect a current working session of the pen;
    wherein, upon transmission of the digital pen strokes to the processing device, the electronic pen is arranged to indicate during which working session the respective digital pen strokes have been input; and
    wherein, upon processing of the digital pen strokes, the processing device is arranged to detect that a certain digital pen stroke is indicated as having been input during a different working session than a preceding digital pen stroke and, as a consequence of this, to restore the property for successive digital pen strokes of the first type to an initial or default state.

2. The system as claimed in claim 1, further comprising an electronic pen comprising
    a control unit; and
    a memory,
    wherein the control unit is arranged to register pen movements across at least one base, to store a plurality of digital pen strokes in the memory as a function of said movements, and to supply a set of the digital pen strokes for processing, and
    wherein
    the control unit is arranged to indicate, for the processing of said set of digital pen strokes, the working session during which the respective digital pen strokes have been input.

3. The system as claimed in claim 2, in which the control unit is arranged to cause only such digital pen strokes of the second type to be processed, which originate from working sessions for which there are digital pen strokes of the first type included in said set.

4. The system as claimed in claim 3, further comprising a session counter which is stored in the memory and which is incremented by the control unit when the session-determining means has detected that a new working session has been initiated, the control unit being adapted to store the digital pen strokes together with the session counter values applying at the time of input of the respective pen strokes and being arranged to use these values when determining which digital pen strokes of the second type are to be processed.

5. The system as claimed in claim 3, in which the control unit is arranged to note the times at which new working sessions are initiated, store these times and use them when determining which digital pen strokes of the second type are to be processed.

6. The system as claimed in claim 1, in which said session-determining means comprises a mechanical, optical, electrical or magnetic switch which is connected to said control unit.

7. The system as claimed in claim 6, in which the pen comprises a pen body and a protective cap, said switch being placed so as to detect that the protective cap is removed from the pen body.

8. The system as claimed in claim 1, wherein the pen is configured to be used with a first base for inputting digital pen strokes of said first type, and with a second base for inputting digital pen strokes of said second type.

9. The system as claimed in claim 1, in which said base comprises a position-coding pattern.

10. The system as defined in claim 1, wherein said property includes at least one of the following: a visual graphic property; temporal or spatial resolution for the pen strokes; a background for the pen strokes; a context to which the pen or its user belongs; or an indication of restricted access to the pen strokes.

11. A method for recording of handwritten or hand-drawn information originating from the pen movements of an electronic pen which are registered as digital pen strokes, wherein the digital pen strokes include a first type, which concerns graphical information constituting said information to be recorded, and a second type, which concerns instructions for the processing of digital pen strokes of the first type, the method comprising the steps of:
  a) detecting a working session of the pen during which the respective digital pen strokes are recorded, wherein a plurality of digital pen strokes are recorded during the working session, and wherein the detected working session is one of a plurality of unique working sessions formed sequentially in time and stored in the electronic pen,
  b) determining the working session(s) during which a plurality of digital pen strokes of said first type were recorded;
  c) supplying for the processing of the plurality of digital pen strokes of the first type, only such digital pen strokes of said second type which have been registered during the working session(s) determined in step b); and
  d) outputting the processed digital pen strokes.

12. The method as claimed in claim 11, wherein step a) is carried out by detecting that the electronic pen is started or activated and, as a consequence of this, incrementing a working session counter, and wherein a value associated with said working session counter is used when performing steps b) and c).

13. The method as claimed in claim 11, wherein step a) is carried out by detecting that the electronic pen is started or activated and, as a consequence of this, recording a time at which this happened, and wherein this time is used when performing at least step c).

14. The method as defined in claim 11, wherein said property includes at least one of the following: a visual graphic property; temporal or spatial resolution for the pen strokes; a background for the pen strokes; a context to which the pen or its user belongs; or an indication of restricted access to the pen strokes.

15. The method as claimed in claim 11, wherein a first base is used for inputting digital pen strokes of said first type, and a second base is used for inputting digital pen strokes of said second type.

16. The method as claimed in claim 15, wherein the first and second base are provided with a position-coding pattern.

17. A method for processing of handwritten or hand-drawn information in the form of a plurality of digital pen strokes which have been registered by the pen movements of an electronic pen and which include a first type, which concerns graphical information constituting said information to be recorded, and a second type, which concerns an indication of at least one property of digital pen strokes of the first type, the method comprising the steps of processing a set of recorded digital pen strokes as follows:
  a digital pen stroke of the second type determines a current property of digital pen strokes of the first type;
  digital pen strokes of the first type are assigned the current property;
  if a certain digital pen stroke is indicated as having been recorded during a different working session of the electronic pen than a preceding digital pen stroke, the current property is reset to an initial or default state, wherein a plurality of digital pen strokes are recorded during the different working session, and wherein the different working session is one of a plurality of unique working sessions formed sequentially in time and stored in the electronic pen, and
  outputting at least the digital pen strokes of the first type and the respective current properties.

18. The method as claimed in claim 17, wherein said property of the digital pen strokes of said first type, which is indicated by digital pen strokes of said second type, includes: a visual graphical property; temporal or spatial resolution for the pen strokes; a background for the pen strokes; a context to which the pen or its user belongs; or an indication of restricted access to the pen strokes.

19. The method as claimed in claim 17, wherein a first base is used for inputting digital pen strokes of said first type, and a second base is used for inputting digital pen strokes of said second type.

20. The method as claimed in claim 19, wherein the first and second base are provided with a position-coding pattern.

21. A computer-readable medium storing a set of instructions, executed by a processor, for carrying out the steps as claimed in claim 17.

22. A computer-readable medium storing a set of instructions, executed by a processor, for carrying out the steps as claimed in claim 11.

* * * * *